United States Patent [19]

Stenberg et al.

[11] Patent Number: 5,344,267
[45] Date of Patent: Sep. 6, 1994

[54] SELF-DRILLING BLIND RIVET

[76] Inventors: Sven E. J. Stenberg, Uddbergsvägen 33; Curt G. Nordström, Bergslagsvägen 21, both of S-773 00 Fagersta, Sweden

[21] Appl. No.: 69,682

[22] Filed: Jun. 1, 1993

Related U.S. Application Data

[60] Continuation of Ser. No. 683,561, Apr. 1, 1991, abandoned, which is a continuation of Ser. No. 457,472, Jan. 2, 1990, abandoned, which is a division of Ser. No. 251,998, Sep. 30, 1988, Pat. No. 4,910,992, which is a continuation of Ser. No. 893,242, Aug. 5, 1986, abandoned.

[51] Int. Cl.⁵ .............................................. F16B 13/04
[52] U.S. Cl. ........................................... 411/29; 411/30
[58] Field of Search .......................... 411/29, 30, 43; 408/144

[56] References Cited

U.S. PATENT DOCUMENTS

| | | | |
|---|---|---|---|
| 1,449,625 | 3/1923 | Phillips | 411/29 |
| 3,412,594 | 11/1968 | Lund | 411/30 X |
| 3,715,952 | 2/1973 | Fischer | |
| 3,851,560 | 12/1974 | Yago | |
| 3,935,786 | 2/1976 | Murray et al. | 411/29 |
| 3,942,240 | 3/1976 | Gebelius | 411/30 X |
| 3,991,454 | 11/1976 | Wale | 408/144 X |
| 4,026,186 | 5/1977 | Williams, Jr. et al. | 411/29 |
| 4,091,882 | 5/1978 | Hashimoto | 411/30 X |
| 4,293,258 | 10/1981 | McKewan | |
| 4,518,290 | 5/1985 | Frichmann et al. | 411/30 |
| 4,575,294 | 3/1986 | Mermi et al. | 411/30 |
| 4,629,380 | 12/1986 | Gunket et al. | 411/29 |
| 4,943,488 | 7/1990 | Sung et al. | 175/430 X |

FOREIGN PATENT DOCUMENTS

| | | |
|---|---|---|
| 1221056 | 10/1962 | Fed. Rep. of Germany . |
| 2244143 | 3/1973 | Fed. Rep. of Germany ........ 411/30 |
| 2244159 | 3/1973 | Fed. Rep. of Germany . |
| 2457136 | 12/1974 | Fed. Rep. of Germany . |
| 2554577 | 12/1975 | Fed. Rep. of Germany . |
| 85165 | 1/1964 | France . |
| 2152796 | 4/1973 | France . |
| 2329886 | 5/1977 | France . |

Primary Examiner—Peter M. Cuomo
Assistant Examiner—Jerry Redman
Attorney, Agent, or Firm—Burns, Doane, Swecker & Mathis

[57] ABSTRACT

A self-drilling blind rivet comprising a rivet sleeve and an upsetting pin passing the rivet sleeve at least partly and projecting from one end of the rivet sleeve. A drill bit is attached to the other end of the rivet sleeve either directly on the sleeve or on one end of the upsetting pin.

32 Claims, 2 Drawing Sheets

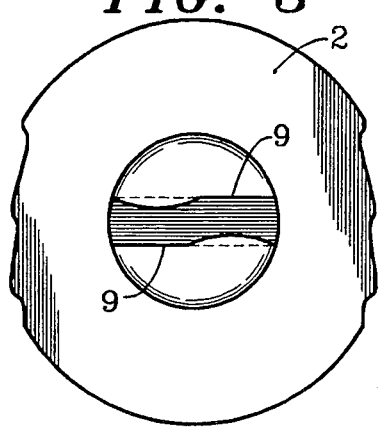
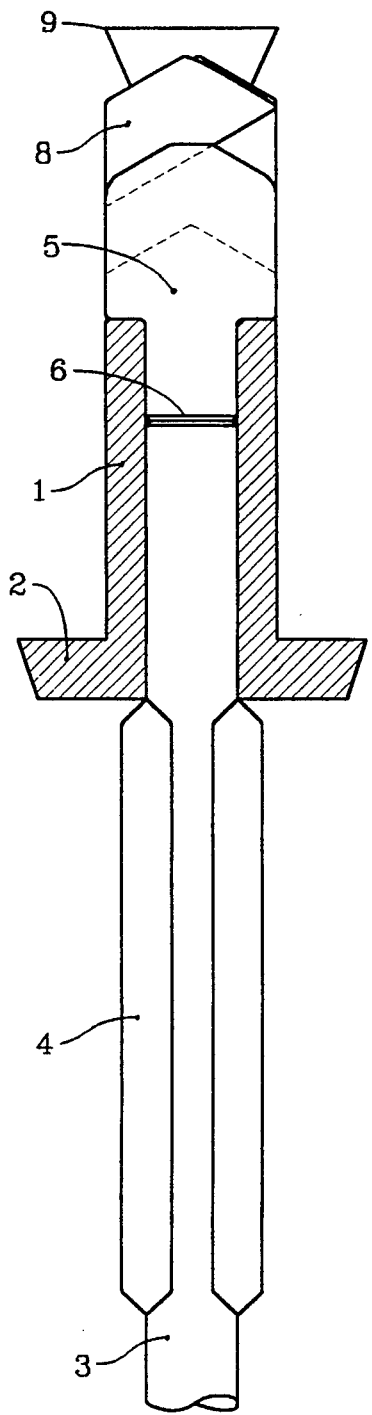
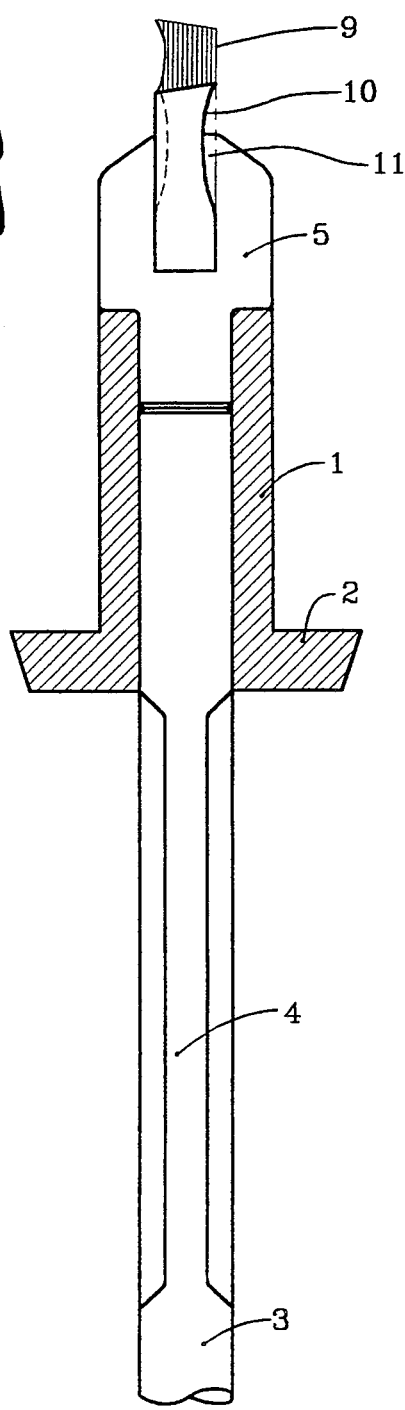
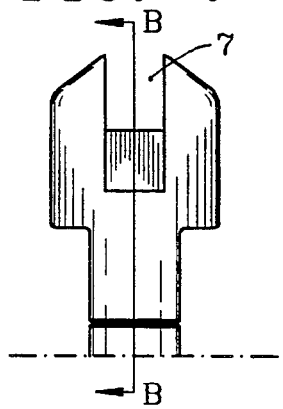
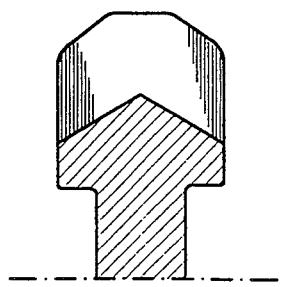

SELF-DRILLING BLIND RIVET

This application is a continuation of application Ser. No. 07/683,561, filed Apr. 1, 1991 (now abandoned), which is a continuation of application Ser. No. 07/457,472, filed on Jan. 2, 1990 (now abandoned), which is a divisional of application Ser. No. 07/251,998, filed on Sep. 30, 1988 (now U.S. Pat. No. 4,910,992), which is a continuation of application Ser. No. 06/893,242, filed on Aug. 5, 1986 (now abandoned).

This invention relates to a self-drilling blind rivet comprising a rivet sleeve and an upsetting pin passing the rivet sleeve at least partly and projecting from one end of the rivet sleeve.

Self-drilling blind rivets are particularly intended for use in tools by means of which drilling as well as drawing of the rivet can be carried out. Such a tool is for instance known from Swedish patent application 8503802-4.

Self-drilling blind rivets are previously known, in which the upsetting pin passes the rivet sleeve and the upsetting shank is provided with a drill point on the end of the rivet sleeve opposed to the end on which drawing is carried out. It is relatively expensive to manufacture these self-drilling blind rivets and, moreover, they have the limitation that they cannot be made for all types of blind rivets, for instance not for air-tight blind rivets where the upsetting pin must be completely surrounded by an air-tight sleeve, for instance a rivet sleeve of aluminum. Such previously known self-drilling blind rivets are for instance disclosed in Swedish lay-open print 411 787, German Public Applications 24 57 136 and 25 54 577 as well as U.S. Pat. No. 3,750,518.

SUMMARY OF THE INVENTION

It is the object of the invention to provide a self-drilling blind rivet which is cheap in manufacture, having excellent drilling properties and, moreover, can also be formed with an air-tight sleeve.

BRIEF DESCRIPTION OF THE DRAWINGS

The invention is now described in greater detail in the form of non-limiting illustrative examples and with reference to the accompanying drawings, wherein:

FIG. 1 is a lateral view, partly in section, of a first embodiment of the rivet according to the invention, FIG. 2 is a lateral view of the rivet in FIG. 1 as seen from the left in FIG. 1, FIG. 3 shows the drill point as seen from the point end, i.e. from above in FIG. 2, FIG. 4 shows the end section of the upsetting pin in FIG. 1 without drill point, FIG. 5 is a cross sectional view B—B taken from FIG. 4.

DETAILED DESCRIPTION

Figure 6:
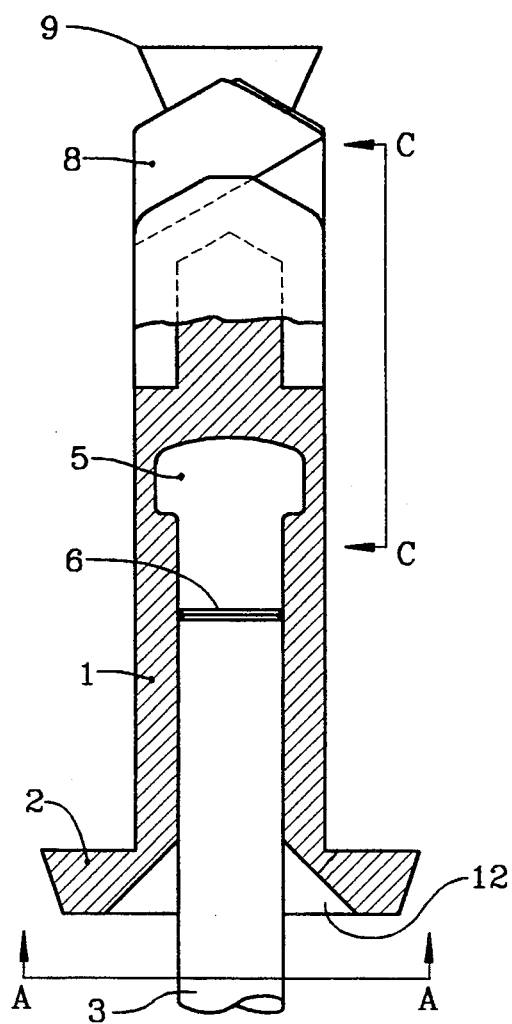
FIG. 6 is lateral view, partly in section, of a second embodiment of a blind rivet according to the invention in an air-tight variant.

A blind rivet according to the invention is shown in FIGS. 1-5 which comprises a rivet sleeve 1 provided with a collar portion 2. An upsetting pin 3 is passing through the central hole in the rivet sleeve 1 which pin is provided with a rotational wing 4 outside the collar portion to enable turning of the upsetting pin 3. At its other end projecting from the rivet sleeve 1 the upsetting pin 3 is provided with an enlarged main portion 5 having about the same outside diameter as the sleeve portion of the rivet sleeve 1. The enlarged main portion 5 is integral with the rest of the upsetting pin 3 but this is provided with a weakened section 6 immediately below the enlarged main portion where the main portion can be separated from the upsetting pin after tightening the rivet. A slot 7 for receiving a cutting means 8 is made in the enlarged portion 5. The cutting means 8 has a cutting edge 9 and a recess arranged below this which is most apparent from FIGS. 2 and 3. The main portion 5 is also preferably formed with a clamping member 11 projecting into the slot 7 and engaging the recess 10 of the cutting means 8 in order to secure the cutting means in the main portion. As is apparent from FIGS. 4 and 5 but also as is indicated with a dashed line in FIG. 1 the bottom of the slot 7 can be inverted roof- or V-shaped, and the cutting means 8 has then a bottom adapted to this for further securing the cutting means in the main portion. The width of the cutting means 8 is somewhat greater than the diameter of the main portion 5 and the sleeve portion of the rivet sleeve 1.

The cutting means 8 is made of another material than that of the rivet sleeve and upsetting pin and can consist of an insert of e.g. drill steel or can be made from a pulverulent material and then preferably pressed to a suitable form.

Figure 7:
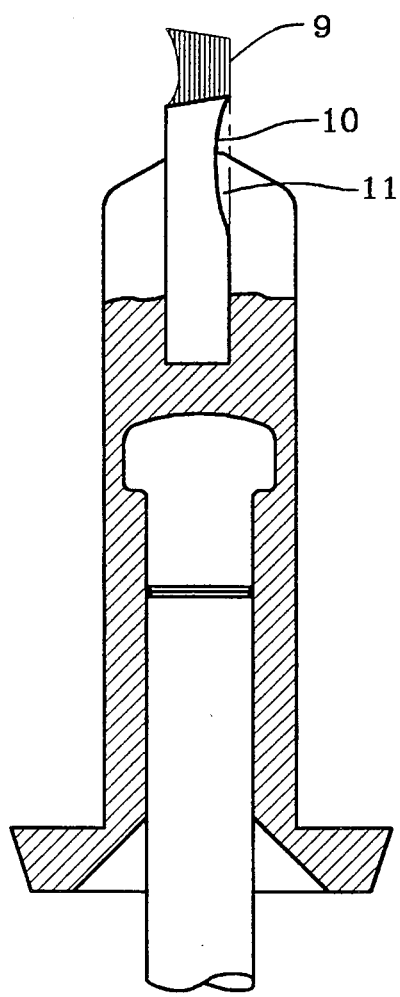
FIG. 7 is a lateral view of the blind rivet in FIG. 5 as seen from the left in FIG. 6.
Figure 8:
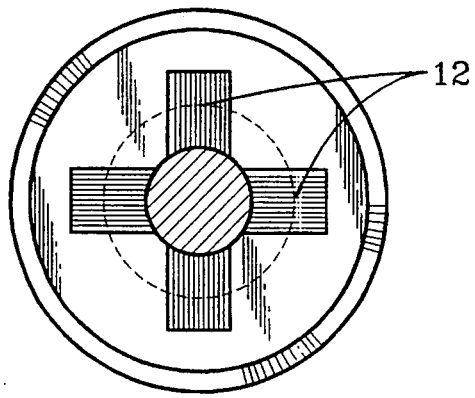
FIG. 8 is a view seen according to the arrows A—A in FIG. 6 showing the collar portion of the rivet sleeve.
Figure 9:
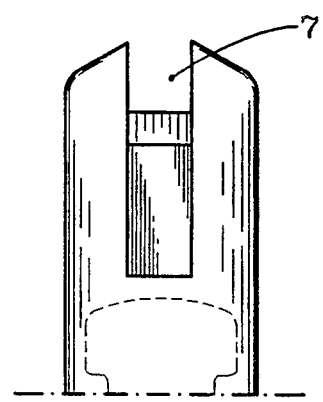
FIG. 9 shows a portion C—C according to the arrows in FIG. 6 showing the end portion of the rivet sleeve with the drill bit removed.

The blind rivet shown in FIGS. 6-9 has also a cutting means 8. However, in this case the upsetting pin 3 does not pass the rivet sleeve 2 completely but the rivet sleeve here encloses the enlarged main portion 5 of the upsetting pin which has a diameter that is less than the diameter of the rivet sleeve. Thus, this rivet is an air-tight rivet, and the cutting means 8 is then here attached directly to the end of the rivet sleeve 1 itself. The embodiment of the cutting means is substantially the same as in the embodiment according to FIGS. 1-5, the bottom of the cutting means however having a somewhat different appearance, as is apparent from FIG. 6 and the slot 7 which is here formed in the end of the rivet sleeve 1, is also formed in another way in agreement with the cutting means. As the upsetting pin 3 is not to be rotated in this case in order to provide the drilling but the rivet sleeve 1 itself is to be rotated, a cross-shaped groove 12 is then formed in the collar portion 2 of the sleeve, as apparent from FIG. 8, in which a suitable turning tool can engage.

Common to all the blind rivets shown in the figures is that the cutting means is made of another material than that of the rivet sleeve and the upsetting pin. The cutting means can be a drill bit of e.g. drill steel or can be made of a pulverulent material, for example silicon carbide, which, thus, can either be pressed to a cutting means which as a separate drill bit is attached to the rivet or the upsetting pin, or be coated on the end of the rivet or the upsetting pin. Nor is it necessary, as the pulverulent material is coated directly on the rivet sleeve, that the rivet sleeve is then formed to a cutting edge but it is also possible in certain cases to apply the cutting pulverulent material directly on a substantially plane end surface of a rivet. How the cutting pulverulent material is to be arranged is dependent on the fact in which material the rivet is intended to be used. Due to the use of a cutting means of another material than that of rivet sleeve and upsetting pin in order to create a cutting effect, it is possible to get excellent drilling properties and to use light metals both in rivet sleeve and upsetting pin, which light metals cannot be used if a cutting effect is to be obtained directly with the metal, and thus rivet sleeve as well as upsetting pin can be made of for example aluminium.

If the cutting means is provided as a separate drill bit it can preferably be attached to the rivet or the upsetting pin by welding or glueing.

Preferably the drill bit 8 can be formed as a drilling blade inserted into a slot formed in the end of the rivet or the upsetting pin, as shown in the drawings.

In the drawing figures rotational wings on the upsetting pin have been shown as well as one cross-shaped groove in the collar portion of the rivet sleeve in order to obtain the required rotation of the rivet for achieving drilling. In these cases the tool being used must be provided with the corresponding engagement means to turn the rivet and/or the upsetting pin by means of a rotational wing or a cross-shaped groove. However, these means providing rotation can also be embodied in many other different ways as will be apparent to one skilled in the art.

We claim:

1. A self-drilling blind rivet comprising:
   a longitudinally extending sleeve having a longitudinally extending central hole which opens at a first end of said sleeve;
   an upsetting pin axially received in said hole and extending out of said hole through said first end, so as to have an internal portion disposed in said hole, and an external portion disposed out of said hole beyond said first end;
   grippable means of non-circular transverse cross-sectional shape provided on one of said sleeve and said pin to form a rotatable member, said grippable means being accessible to a turning tool from externally of said hole, for bodily rotating said rotatable member about the longitudinal axis of said sleeve and said pin; and
   a drill bit mounted in a slot provided on said rotatable member so as to protrude axially beyond a second end of said sleeve opposite from said first end, said drill bit being a planar drill bit that is made of a harder material than both said sleeve and said pin, said slot having axially extending side walls and a transverse bottom wall, said bottom wall having a V-shape projection which mates with a V-shaped gap in said drill bit, and opposed, clamping projections provided on the side walls extending transversely into the slot for engaging clamping recesses in the drill bit to secure said drill bit in said slot.

2. The self-drilling rivet of claim 1, wherein:
   said drill bit is made of drill steel.

3. The self-drilling rivet of claim 1, wherein:
   said drill bit is made of a compacted powder.

4. The self-drilling rivet of claim 3, wherein:
   said drill bit is made of silicon carbide.

5. The self-drilling rivet of claim 1, wherein:
   said upsetting pin terminates within said hole and said drill bit is provided on said sleeve.

6. The self-drilling rivet of claim 1, wherein:
   said drill bit is secured to said rotatable member by a weld.

7. The self-drilling rivet of claim 1, wherein:
   said drill bit is secured to said rotatable member by glue.

8. The self-drilling rivet of claim 1, wherein:
   said sleeve and said upsetting pin are made of aluminum and said drill bit is made of a heavier material than aluminum.

9. The self-drilling rivet of claim 8, wherein:
   said drill bit is made of drill steel.

10. The self-drilling rivet of claim 8, wherein:
    said drill bit is made of compressed, powdered silicon carbide.

11. The self-drilling rivet of claim 1, wherein:
    said sleeve includes a radially extending collar at said first end of said sleeve.

12. The self-drilling rivet of claim 11, wherein:
    said upsetting pin terminates within said hole and said drill bit is provided on said sleeve.

13. The self-drilling rivet of claim 12, wherein:
    said upsetting pin includes an enlarged main portion located within said hole of said sleeve and a line of weakness formed transversely across said upsetting pin between said enlarged main portion and said opening, so that said upsetting pin is predisposed to break off at a location intermediate the axial extend of said hole.

14. The self-drilling rivet of claim 13, wherein:
    said grippable means comprises an axially facing groove formed in an end surface of said sleeve at said first end of said sleeve radially outwardly of said opening.

15. The self-drilling rivet of claim 1, wherein, said sleeve is tubular, said upsetting pin also extends out of said hole at said second end of said sleeve and said drill bit is provided on said upsetting pin axially beyond said second end of said sleeve.

16. The self-drilling rivet of claim 15, wherein:
    said upsetting pin is provided with a transversally extending line of weakness located intermediate the axial extend of said hole, so that said upsetting pin is predisposed to break off at a location intermediate the axial extend of said hole.

17. The self-drilling rivet of claim 16, wherein:
    said grippable means comprises a transversally broadened wing formed on said upsetting pin.

18. A self-drilling blind rivet comprising:
    a first member constituted by a longitudinally extending sleeve having a longitudinally extending central cavity which opens at a first end of said sleeve;
    a second member constituted by an upsetting pin axially received in said cavity and extending out of said cavity through said first end, so as to have an internal portion disposed in said cavity, and an external portion disposed out of said cavity beyond said first end;
    grippable means provided on one of said first and second members so as to be accessible to a turning tool from externally of said cavity, for bodily rotating said member having grippable means about the longitudinal axis of said first and second members; and
    a drill blade, having planar, axially extending sides, mounted in a slot provided on said member having grippable means so as to protrude axially beyond second end of said sleeve opposite said first end, said drill blade being formed of a material that is more durable than both the material of which said sleeve is made and the material of which said pin is made, when used as a drill blade;

said drill blade having a V-shaped gap that mates with a V-shaped projection projecting from said member having grippable means into said slot, said drill blade having opposed recesses that engage opposed, transverse clamping projections on said member having grippable means extending in the slot to secure said drill blade to said one member.

19. A self-drilling blind rivet comprising:

a rivet sleeve having oppositely positioned first and second ends, said rivet sleeve having a bore that extends at least part of the way therethrough, the bore opening to the second end of the rivet sleeve;

an upsetting pin having first and second ends, a portion of said upsetting pin being positioned in the bore in the rivet sleeve and the second end of the upsetting pin extending out of the second end of the rivet sleeve; and a drill bit mounted in a slot formed on one of said first end of the rivet sleeve and said first end of the upsetting pin, said drill bit being a planar drill bit which is fabricated of a material that is different from the material from which the upsetting pin and the rivet sleeve are fabricated;

said slot having axially extending side walls and a transverse bottom wall, said bottom wall having a V-shaped axial projection which mates with a V-shaped gap in a mounting end of said drill bit, said side walls having opposed, clamping projections extending transversely into the slot for engaging clamping recesses in the drill bit to secure said drill bit in said slot.

20. The self-drilling blind rivet according to claim 19, wherein the bore in the rivet sleeve extends completely through the rivet sleeve and opens to the first end of the rivet sleeve, said upsetting pin extending completely through the rivet sleeve so that the first end of the upsetting pin extends out of the first end of the rivet sleeve.

21. The self-drilling blind rivet according to claim 20, wherein a portion of the upsetting pin adjacent the first end thereof is enlarged in the radial direction, the enlarged portion of the upsetting pin having an outside diameter that is greater than the inside diameter of the bore in the rivet sleeve.

22. The self-drilling blind rivet according to claim 20, wherein the slot in which the drill bit is mounted is formed in the first end of the upsetting pin, said slot extending axially along the upsetting pin.

23. The self-drilling blind rivet according to claim 20, wherein said drill bit is welded to the first end of the upsetting pin.

24. The self-drilling blind rivet according to claim 20, wherein said drill bit is glued to the first end of the upsetting pin.

25. The self-drilling blind rivet according to claim 19, wherein said first end of the rivet sleeve is closed so that the first end of the upsetting pin is enclosed within the bore in the rivet sleeve.

26. The self-drilling blind rivet according to claim 25, wherein the slot in which the drill bit is mounted is formed in the first end of the sleeve, said slot extending axially along the sleeve.

27. The self-drilling blind rivet according to claim 19, wherein said drill bit is made of drill steel, and said rivet sleeve and said upsetting pin are made of a material other than drill steel.

28. The self-drilling blind rivet according to claim 19, wherein said drill bit is made of a pressed pulverulent material, and said upsetting pin and said rivet sleeve are made of a material other than pulverulent material.

29. The self-drilling blind rivet according to claim 19, wherein the second end of said upsetting pin is positioned opposite said drill bit relative to the rivet sleeve.

30. The self-drilling blind rivet according to claim 29, wherein said drill bit is formed as a part of said upsetting pin, and said drill bit extends beyond the first end of the rivet sleeve.

31. The self-drilling blind rivet according to claim 29, wherein said first end of the rivet sleeve is closed so that the first end of the upsetting pin is enclosed within the bore in the rivet sleeve, said drill bit being attached to said first end of said rivet sleeve and the first end of the upsetting pin being enlarged and having an outer diameter that is less than an outer diameter of the rivet sleeve.

32. The self-drilling blind rivet according to claim 19, wherein said drill bit is formed as a drilling blade.

* * * * *